United States Patent [19]

Augustin et al.

[11] Patent Number: 5,704,130
[45] Date of Patent: Jan. 6, 1998

[54] MEASURING INSTRUMENT

[75] Inventors: Victor Augustin; Eduard Fischer, both of Chur, Switzerland

[73] Assignee: Raytec AG, Chur, Switzerland

[21] Appl. No.: 783,787

[22] Filed: Jan. 15, 1997

Related U.S. Application Data

[63] Continuation of Ser. No. 256,371, filed as PCT/EP93/00111, Jan. 19, 1993, abandoned.

[30] Foreign Application Priority Data

Jan. 22, 1992 [CH] Switzerland ............ DD 185/92-4

[51] Int. Cl.$^6$ ............................................. G01C 9/06
[52] U.S. Cl. ................................................. 33/366
[58] Field of Search ............................ 33/366, DIG. 3

[56] References Cited

U.S. PATENT DOCUMENTS

| | | | |
|---|---|---|---|
| 3,009,255 | 11/1961 | Robillard | 33/366 |
| 3,164,023 | 1/1965 | Holderer | 33/366 |
| 4,060,910 | 12/1977 | Gell, Jr. | 33/366 |
| 4,861,981 | 8/1989 | Winiger | 33/366 |
| 5,101,570 | 4/1992 | Shimura | 33/366 |
| 5,148,018 | 9/1992 | Ammann | 33/366 |

FOREIGN PATENT DOCUMENTS

| | | | |
|---|---|---|---|
| 157934 | 12/1982 | Germany | 33/366 |
| 3150959 | 6/1983 | Germany | 33/366 |
| 295413 | 10/1991 | Germany | 33/366 |
| 109206 | 4/1989 | Japan | 33/366 |
| 146817 | 6/1991 | Japan | 33/366 |
| 1012018 | 4/1983 | U.S.S.R. | 33/366 |

Primary Examiner—Thomas B. Will
Attorney, Agent, or Firm—Jones, Tullar & Cooper, P.C.

[57] ABSTRACT

An optical measuring system to indicate or determine the relative position of an object and/or a substrate in relation to a horizontal plane comprises an at least partially transparent measuring chamber containing two non-miscible media with different densities, one of the media being at least partially transparent or translucent and at least the other being a fluid medium. The relative position is found on the basis of the position of the at least partially transparent or translucent medium in the measuring chamber, when what is concerned is an optical instrument operating on the principle of a spirit level. On one side of the measuring chamber is a light source and on the opposite side there is an optical measuring cell or a flat, light-sensitive sensor. The light transmitted from the light source through the at least partially transparent or translucent medium is projected on the optical measuring cell or the flat, light-sensitive sensor and the projection is used to determine the relative position of the object in relation to the horizontal.

12 Claims, 4 Drawing Sheets

MEASURING INSTRUMENT

This is a continuation of application Ser. No. 08/256,371 filed on Sep. 30, 1994 now abandoned.

BACKGROUND OF THE INVENTION

The present invention relates to an opto-electronic measuring instrument for determining the relative position of an object with respect to a horizontal plane, with an at least partially transparent measuring chamber in which two media of different density which cannot be mixed are contained, wherein one of the media is at least partially transparent or translucent and at least the other is a fluid medium, and wherein the relative position is determined on the basis of the position of the at least partially transparent medium in the measuring chamber, with a light source and a light-sensitive sensor, onto which the light transmitted by the light source through the at least partially transparent medium is projected and the projection is used to determine the relative position. The invention furthermore relates to a method for determining the relative position of an object with respect to a horizontal plane by means of a measuring instrument. Finally, the invention relates to a use of the measuring instrument.

Instruments for determining the relative position or the angle of objects with respect to the horizontal plane or the perpendicular are known. Probably the best known instrument is the so-called water level or bubble level, in which an air bubble is maintained in a liquid inside a curved tube closed at both ends and wherein this bubble is located exactly at the zenith of the tube curve over the entire measuring range.

In the course of improving the measuring accuracy, this relatively rough-indicating device was refined in that other gases were used in place of air, or even that an extremely small amount of a second liquid of lower density, which cannot be mixed with the first liquid and in addition is transparent, is also enclosed in the first liquid and the first liquid is colored or opaque.

It is possible by an appropriate optimization of the two non-mixable fluid media to create minute bubbles for allowing an extremely close measurement by means of a principle corresponding to the conventional water level. In this way special oils, liquid silicons, noble gases, etc. are used today for a measuring instrument operating in accordance with the described medium.

In spite of this the problem of an accurate optical detection remains, because definite limits are set for the accuracy of reading off, even with the most minute bubbles, while the ease of reading is poor, i.e. the visual detection of the small bubbles is hardly possible.

An opto-electronic inclination detection is known from the reference "TECHNISCHES MESSEN" [Technical Measuring], vol. 58, No. 3, March 1991, München DE, pp 101 to 105, XP 224809 and from GB 2,232,762 A, FR 2,368,694 A and EP 168 150 A1. However, these known devices only permit angular measurements within a narrow angular range of approximately ±20°. A 360° measurement is not possible with these devices.

A further electronic inclinometer is known from DE 38 36 794 A1, which has a tube in the shape of an arc of a circle in which an air bubble is entrained. Beams are directed radially from the inside to the outside through this tube. A sensor is provided at the zenith which, after an inclination of the device, is returned to the zenith by an adjustment device. The angle of inclination is calculated by means of the adjustment device. This device is relatively cumbersome and slow.

SUMMARY OF THE INVENTION

It is therefore an object of the present invention to provide a device which permits a measurement over an angle range of 360°.

This object is attained in accordance with the present invention in that the light source, the measuring chamber and the light sensitive sensor are disposed behind each other on a horizontal axis, that the light source is disposed on one side of the measuring chamber and the light-sensitive sensor on the other side of the measuring chamber, that the measuring chamber is embodied as a circular tube or a hollow body in the shape of a circular disk and that the entire projection of the measuring chamber is placed on the light-sensitive sensor.

An optical measuring instrument is proposed which essentially operates in accordance with the known principle of the water level determining the relative position of an object with respect to a horizontal plane or the perpendicular. The present measuring instrument proposed by the invention comprises an at least partially transparent measuring chamber containing two media of different density which cannot be mixed, wherein one of the media is at least partially transparent or translucent and at least the other is a fluid medium, and wherein the relative position or the angular position of the object with respect to the horizontal plane is determined on the basis of the position of the at least partially transparent or translucent medium in the measuring chamber. A light source is disposed on one side of the measuring chamber, i.e. one side of the measuring chamber is illuminated by means of the light source, and an optical measuring cell or a light-sensitive, flat sensor is disposed on the opposite side of the measuring chamber, i.e. the side opposite the illumination, onto which the light transmitted by the light source through the at least partially transparent or translucent medium is projected, wherein the projection is used for determining the relative position of the object with respect to the horizontal plane. In the process it is also possible for the light to be polarized while moving through the medium. Exemplary embodiments will be subsequently described wherein the light can also be polarized, so that a special mention of this in every example can be omitted. It is furthermore pointed out that the projection of the light can be performed by using lenses or other optical means, such as filters, prisms, of the like, or directly, i.e. without lenses and the like.

Preferably both media are fluid media and one of the media is an opaque medium or impervious to light, wherein the two media are enclosed in a transparent and/or preferably glass-like hollow body.

At least one of the media here must be liquid, while the other medium can also be liquid or gaseous or solid.

Depending on whether the at least partially transparent or translucent medium has a higher or lower density than the other medium, the former is disposed at the zenith or the side opposite the zenith of the hollow body or the measuring chamber.

Depending on the relative position to be measured or of the angle enclosed by the object and the horizontal plane, the measuring chamber or hollow body can be embodied in different ways, preferably with a constant cross section transversely to the tube or the disk.

The optical measuring cell or the light-sensitive flat sensor disposed for detecting the projection can be, for example, a so-called PSD detector (position-sensitive device) or a so-called CCD (charged coupled device). However, any optical or light-sensitive measuring cells are suitable for this.

For determining the relative position of an object with respect to the horizontal plane by means of the above described measuring instrument in accordance with the present invention, light from a light source, which is disposed on one side of the measuring chamber, is transmitted through the measuring chamber and through the at least partially transparent or translucent fluid medium and is projected onto the optical measuring cell or the light-sensitive flat sensor disposed on the side opposite the other side, wherein from the position of the projection on the cell or on the sensor the relative position of the object or the substrate is determined.

The relative position or the angular position of the object is determined by means of the position of the center of the transmitted light spot or the shadow of the projection onto the position-sensitive light sensor and is displayed by means of suitable evaluation and indicator elements.

The measuring instruments defined by the present invention or the method for operating them are particularly suited for use in an electronic water level. Further uses are found in electronic leveling instruments, level meters, compensators and devices for the electronic detection of the acceleration of an object.

The invention will be explained below in detail by way of example by means of preferred devices in accordance with the present invention.

DESCRIPTION OF THE PREFERRED EMBODIMENTS

Figure 1:
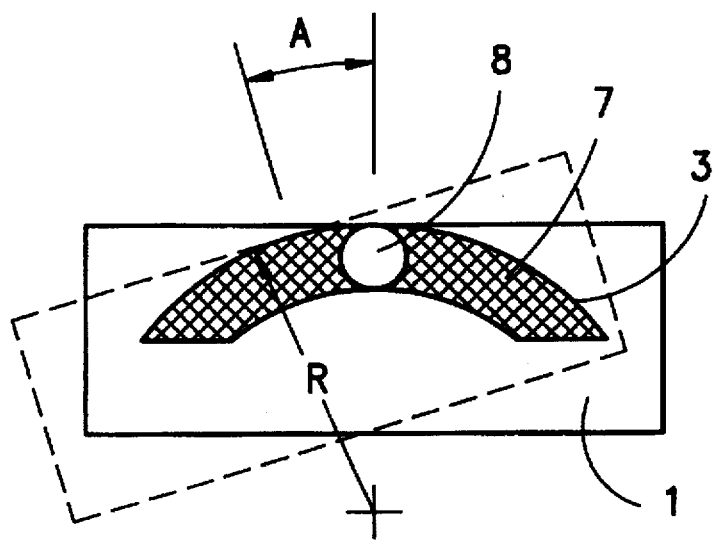
FIGS. 1 and 2 illustrate the conventional functional principle of an opto-electronic measuring instrument of the present invention schematically longitudinally and in cross section.
Figure 2:
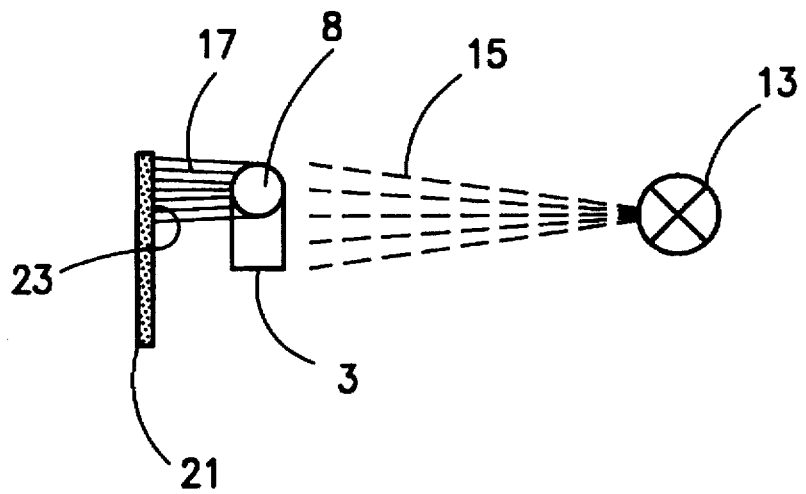
Figure 3:
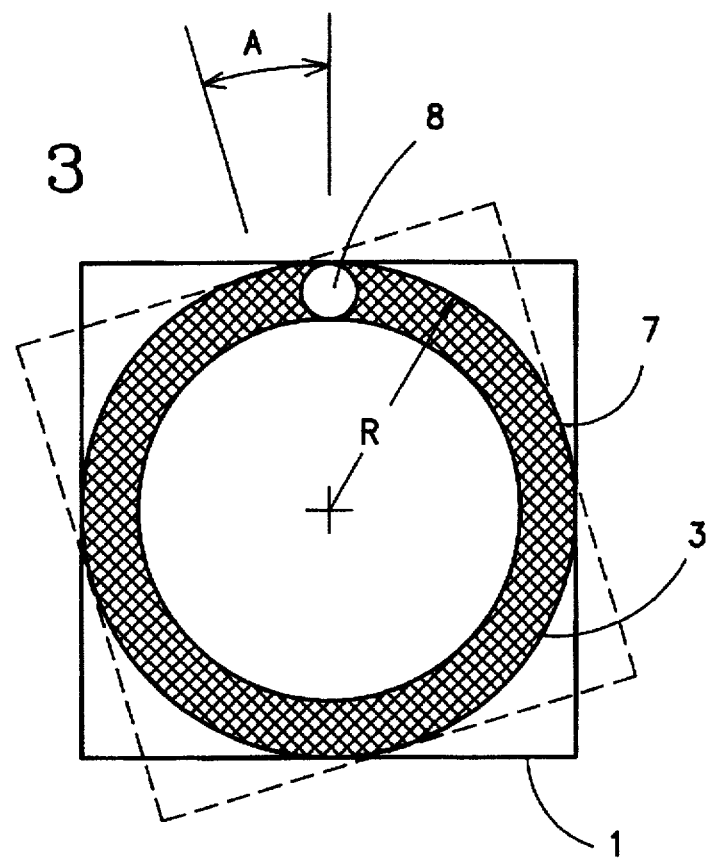
FIGS. 3 and 4 are a longitudinal view and a cross sectional view of a first variant embodiment of a measuring instrument.

A measuring chamber 1 is represented in FIGS. 1, 3, 5 and 9 in longitudinal and cross section, containing a circular segment or annularly or similar embodied hollow body 3. The circularly bent hollow body 3 contains a viscous translucent or opaque liquid 7 with an air bubble 8 or a bubble of a transparent or at least partially transparent medium. As can be clearly seen in FIGS. 2 and 4, a light source 13 is disposed on one side of the tube 3. The light beams 15 emitted by this light source 13 illuminate the hollow body 3 on one side. Since the hollow body 3 is embodied to be glass-like, a part of the light in the area of the air bubble 8 is transmitted through the hollow body and the light beams 17 which pass through correspondingly are projected onto a light sensor 21 disposed on the other side of the hollow body 3.

In the process a light spot or shadow 23 is generated on the light-sensitive sensor 21.

If now the object on which the optical measuring chamber 1 of the present invention is disposed to be inclined with respect to the horizontal plane (FIGS. 1 and 3), the air bubble 8 or the bubble of the transparent or partially transparent medium moves inside the hollow body 3. However, the light spot or shadow 23 also moves on the light-sensitive sensor 21, by means of which the different relative position (A), shown in dashed lines of the object can be optically detected. The detection of the light spot 23 and the evaluation of the position of this light spot 23 on the light-sensitive sensor 21 takes place in accordance with techniques known per se, in that the sensor 21 can be a so-called position-sensitive detector PSD (position sensitive device), for example. The detection of the light spot or the projection is particularly simple in this case, because the center of the light spot 23 is always automatically detected, because of which additional calculating operations can be omitted. However, it is also possible to select a matrix-like detector CCD (charged coupled device) in the form of silicon cells, in connection with which it is first necessary to calculate the center of the light spot projected onto the matrix.

In place of a liquid or air, it is also possible to select two different liquids forming two separate phases and having different densities. It is also possible to select a noble gas, such as helium, in place of air. Since the optimal selection of the liquids or of a gas and a liquid represent commonly known technologies, no further reference is made to it here.

It is of course also possible to dispose a solid body of low density in a liquid. It is also possible to enclose a small amount of a colored or opaque liquid in a transparent liquid, so that reversely to what was described above, a dark spot in place of a light spot is generated on the light-sensitive sensor or detector. However, the basic principle remains the same here.

Figure 4:
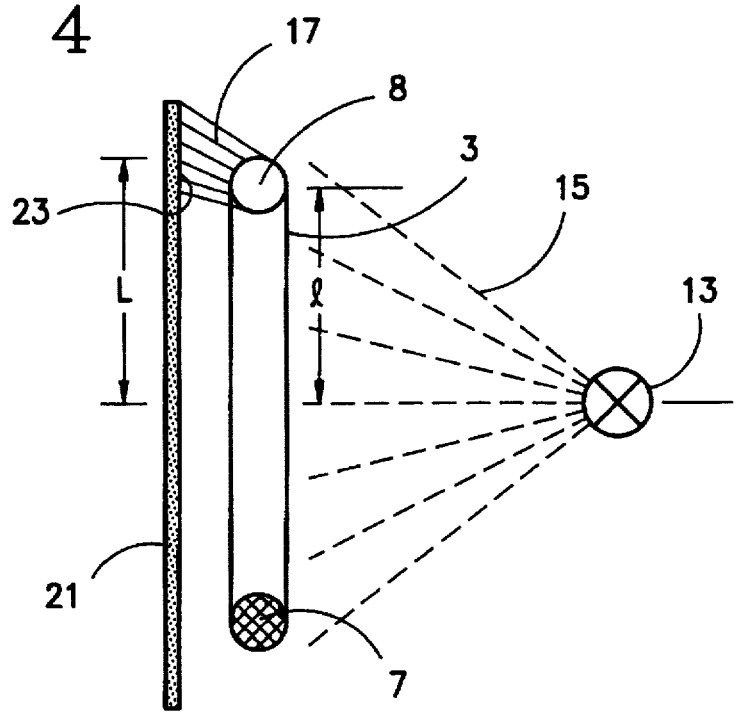

As shown in FIG. 4, the location of the light source 13 and the air bubble 8 or the bubble of a transparent or partially transparent medium is such that an amplification of the projection of the air bubble 8 or the bubble of a transparent or partially transparent medium on the light-sensitive sensor 21 occurs. This amplification can be expressed by the ratio of the lengths L/l. Moreover, this amplication can also be controlled (increased or decreased) by positioning the light-sensitive sensor 21 further from the hollow body 3 than is shown in FIG. 4.

Figure 5:
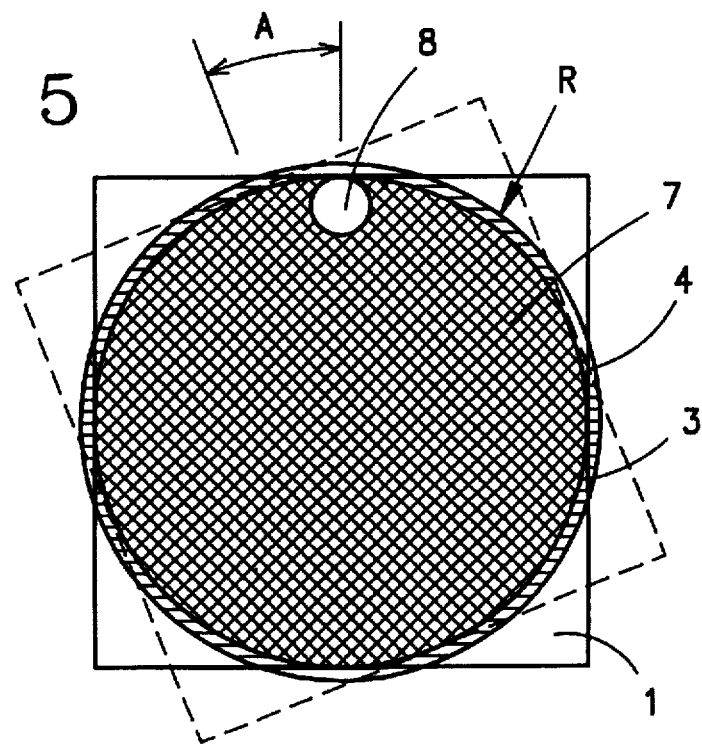
FIGS. 5 and 6 are a further variant embodiment of the present invention.
Figure 6:
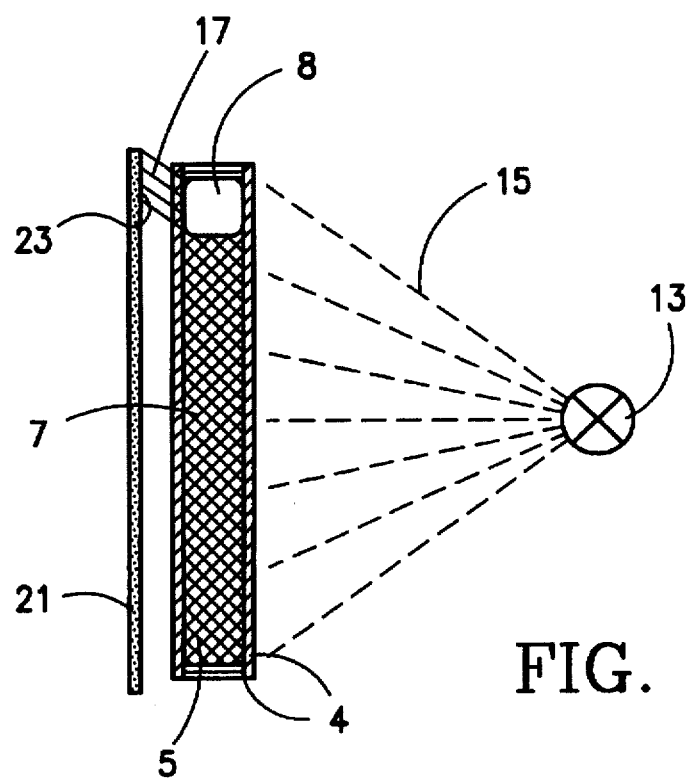

In FIGS. 5 and 6 the measuring chamber 1 comprises a disk-like circular hollow body 3 with an exterior wall 4. In this case the circular disk has a constant cross section transversely to the disk. Again, the hollow body 3 contains a liquid 7 which is opaque or impervious to light and an air bubble 8 or a bubble of a transparent or partially transparent medium.

The mode of operation of the measuring instrument in accordance with FIGS. 5 and 6 is analogous to that of the previously described measuring instruments.

The advantage of the two measuring instruments in resides in that the relative position or angular deviation of an object can be measured or detected over a complete turn of a circle, i.e. over 360°. This is in contrast to conventional water levels in accordance with FIGS. 1 and 2, wherein a deviation of an object or the angular deviation is only possible respectively over 40° to 50° in respect to the horizontal. The accuracy of measurement can be chosen to be different by means of the selection of the radius R. With a very large radius R the accuracy of measurement is of course greater than with a small radius R. However, the size of the measuring instrument in accordance with the present invention increases when a greater radius R is selected, because of which the use might possible become questionable.

Figure 7:
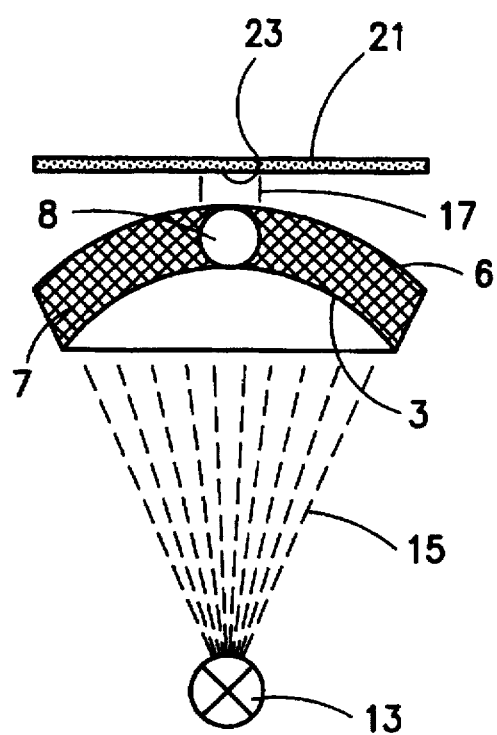
FIGS. 7 to 9 are a further changed variant embodiment of the measuring instrument of the present invention.
Figure 8:
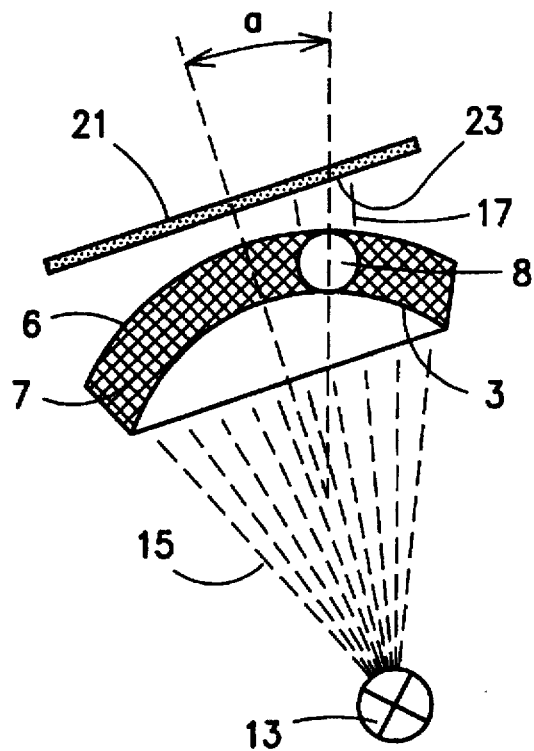
Figure 9:
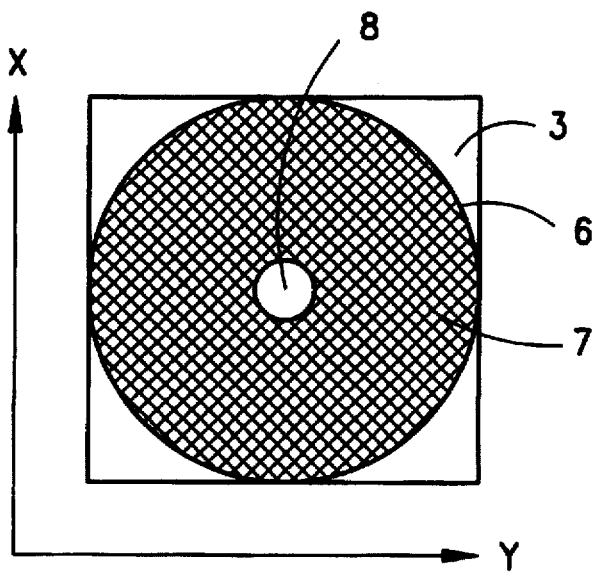

While the measuring arrangements in accordance with FIGS. 1 to 6 only make possible the one-dimensional relative position of an object with respect to the horizontal plane, the two-dimensional detection of a relative position or angular position of an objection in respect to the horizontal is possible by means of an arrangement in accordance with FIGS. 7 to 9. In this case FIGS. 7 and 9 show a longitudinal section through a measuring instrument in accordance with the present invention, while FIG. 9 shows the measuring instrument in accordance with the present invention from above, wherein the light sensitive sensor has been removed. The hollow body 3, containing the liquid 7, which is opaque or impervious to light, or another medium and a second medium of different density and different transparency has a spherically embodied surface 6. The hollow body 3 has a spherical surface opposite the spherical surface and oriented toward the light source 13. Again the light beams 15 which are emitted by the light source 13 enter the hollow body 3, wherein an increased transmission of the light beams through the hollow body 3 is made possible in the area of the air bubble 8. Thus, in the embodiment in accordance with FIGS. 7, 8 and 9, light is projected on the entire surface of the light-sensitive cell or the detector 21, but with increased intensity in the area of the light spot 23. It is therefore necessary in the case of the arrangement in accordance with FIGS. 7 to 9 to determine the center of the light in order to determine the position of the air bubble 8 in the hollow body 3 accurately.

As can be seen in FIG. 9, angling of an object in relation to the horizontal plane is possible in a two-dimensional way by means of a measuring instrument in accordance with FIGS. 7 to 9, as well as the angle enclosed by the object and a horizontal plane along an X axis as well as a Y-axis is possible. Analogously to the previously described variant embodiments of a measuring instrument, it is also possible in connection with the example in FIGS. 7 to vary the accuracy of measurement or to adapt it to the requirements by an appropriate selection of the radius of the spherically embodied surface 6.

It is furthermore also possible to modify the exemplary embodiment in accordance with FIGS. 7 to 9 such that the hollow body is not shaped similar to a hemisphere, but instead corresponds to a hollow-shaped hemispherically embodied shell, so that the problem of the special selection of an only weakly transparent medium does not occur, in that in this case the air bubble adjoins both sides of the glass-like embodied wall or surface, analogous to the earlier examples. It would even be possible in principle to embody a hollow-shaped spherical shell which corresponds to a complete spherical surface, and to dispose the light source in the center of the sphere. However, the structural solution is relatively complicated because the two spherical shells delimiting the spherical body must be kept at the same distance all around and in addition a supply for operating the light source must take place through the spherical shell. In this way it is possible to measure the relative position of an object to the surface in the X as well as in the Y direction over respectively 360°.

The variant embodiments of the invention are used for explaining and better understanding the present invention and can of course be modified, varied or changed in any desired way. Thus it is possible to select any combinations of two media which cannot be mixed, wherein at least one of the media, which is virtually used as the carrier medium, must be fluid, i.e. liquid. The other medium for the indication or detection of the relative position of an object in respect to the horizontal can be either solid, liquid or gaseous. The design of the measuring chamber itself can also be selected in any way, basically all transparent hollow bodies or measuring chambers operating in accordance with the general principle of a water level are suitable. The selected light source can also be either visible light, infrared or UV, where in the latter cases the two media in the hollow body must of course be selected such that the detection of the emitted light on an appropriately sensitive detector material is possible.

It remains essential for the present invention that in an optical measuring instrument operating in accordance with the principle of a water level the measurement is detected by means of a light beam and an appropriately disposed light-sensitive detector and subsequently visualized by means of suitable elements.

We claim:

1. A measuring instrument for determining the relative position of an object with respect to a horizontal plane, comprising:
    a measuring chamber embodied as a hollow body, said measuring chamber containing two media of different density which cannot be mixed, one of the media being at least partially transparent and the other of the media being a fluid media;
    a light source for emitting light which is transmitted through said at least partially transparent medium; and
    a light-sensitive sensor onto which the light transmitted through said at least partially transparent medium is projected for forming a projection entirely placed on said light-sensitive sensor, wherein:
    said measuring chamber, said light source and said light-sensitive sensor are arranged in axial alignment along a horizontal axis, with said light source being disposed on one side of said measuring chamber and with said light-sensitive sensor being disposed on the other side of said measuring member,
    said arrangement being such that said projection is an amplification of said at least partially transparent medium, and
    the relative position of an object with respect to a horizontal plane being determined on the basis of said at least partially transparent medium in said measuring chamber.

2. The measuring instrument as defined in claim 1, wherein said hollow body comprises a circular tube.

3. The measuring instrument as defined in claim 1, wherein said hollow body comprises a circular disk.

4. The measuring instrument as defined in claim 1, wherein one of said media polarizes light.

5. The measuring instrument as defined in claim 1, wherein both media are fluid media, with one being opaque or impervious to light, and wherein both media are enclosed in said hollow body.

6. The measuring instrument as defined in claim 5, wherein said hollow body is made of glass.

7. The measuring instrument as defined in claim 5, wherein said at least partially transparent medium is less than said opaque medium.

8. The measuring instrument as defined in claim 1, wherein said hollow body defines a zenith, and wherein said partially transparent medium is disposed at said zenith.

9. The measuring instrument as defined in claim 1, wherein said hollow body defines a zenith, and wherein said partially transparent medium is disposed at the side opposite to said zenith.

10. The measuring instrument as defined in claim 1, wherein said hollow body has a constant cross section.

11. The measuring instrument as defined in claim 1, wherein said light-sensitive sensor compresses a position-sensitive detector.

12. The measuring instrument as defined in claim 1, wherein said light-sensitive sensor comprises a matrix-like detector.

\* \* \* \* \*